US008400276B2

(12) United States Patent
Tanaka

(10) Patent No.: US 8,400,276 B2
(45) Date of Patent: Mar. 19, 2013

(54) MONITORING SYSTEM, TERMINAL DEVICE AND MAIN CONTROL DEVICE THEREOF, AND METHOD AND PROGRAM FOR REGISTERING TERMINAL DEVICE

(75) Inventor: Yoshihei Tanaka, Kyoto (JP)

(73) Assignee: Omron Corporation, Kyoto (JP)

( * ) Notice: Subject to any disclaimer, the term of this patent is extended or adjusted under 35 U.S.C. 154(b) by 1079 days.

(21) Appl. No.: 12/282,301

(22) PCT Filed: Mar. 7, 2007

(86) PCT No.: PCT/JP2007/054402

§ 371 (c)(1),
(2), (4) Date: Sep. 9, 2008

(87) PCT Pub. No.: WO2007/105553

PCT Pub. Date: Sep. 20, 2007

(65) Prior Publication Data

US 2009/0040026 A1 Feb. 12, 2009

(30) Foreign Application Priority Data

Mar. 13, 2006 (JP) ................................ 2006-068303

(51) Int. Cl.
*H04Q 5/22* (2006.01)

(52) U.S. Cl. .................. 340/10.4; 340/10.1; 340/10.34; 340/10.5

(58) Field of Classification Search ............... 340/572.4, 340/10.4, 10.42, 9.1, 10.5, 5.92
See application file for complete search history.

(56) References Cited

U.S. PATENT DOCUMENTS

| | | | | |
|---|---|---|---|---|
| 6,346,884 | B1 * | 2/2002 | Uozumi et al. | 340/572.1 |
| 2002/0174336 | A1 | 11/2002 | Sakakibara et al. | |
| 2003/0095032 | A1 | 5/2003 | Hoshino et al. | |
| 2003/0120745 | A1 | 6/2003 | Katagishi et al. | |
| 2004/0070491 | A1 * | 4/2004 | Huang et al. | 340/10.5 |
| 2005/0003815 | A1 | 1/2005 | Schreyer et al. | |
| 2005/0248456 | A1 * | 11/2005 | Britton et al. | 340/539.29 |
| 2006/0061452 | A1 * | 3/2006 | Nagayama et al. | 340/10.5 |
| 2006/0109966 | A1 | 5/2006 | Sasakura et al. | |

FOREIGN PATENT DOCUMENTS

| | | |
|---|---|---|
| EP | 1 628 273 A1 | 2/2006 |
| JP | 2003-157477 | 5/2003 |
| JP | 2003-198451 | 7/2003 |
| JP | 2004-246492 | 9/2004 |
| JP | 2005-223791 | 8/2005 |
| JP | 2005-276021 | 10/2005 |

(Continued)

OTHER PUBLICATIONS

European Patent Office extended search report on application 07737916.2 dated Jul. 16, 2012; 6 pages.

*Primary Examiner* — Daniel Wu
*Assistant Examiner* — Frederick Ott
(74) *Attorney, Agent, or Firm* — Foley & Lardner LLP

(57) ABSTRACT

By pushing the registration switch of a main controller, a radio signal for requesting the transmission of a terminal-device ID number is transmitted (SP1, SP2). A wireless sensor sends back the terminal-device ID number (SP11, SP12), and the main controller stores the received terminal-device ID number in its storage unit and transmits a main-controller device ID number (SP4, SP5). The wireless sensor stores the main-controller device ID number in its storage unit. From then on, communications between devices whose device ID numbers have been registered are permitted.

7 Claims, 4 Drawing Sheets

FOREIGN PATENT DOCUMENTS

| | | | |
|---|---|---|---|
| JP | 2005-323172 | | 11/2005 |
| JP | 2006-004257 | | 1/2006 |
| WO | WO-02/086808 | | 10/2002 |
| WO | WO 03/061176 | A2 | 7/2003 |
| WO | WO 2004/086328 | | 10/2004 |

* cited by examiner

MONITORING SYSTEM, TERMINAL DEVICE AND MAIN CONTROL DEVICE THEREOF, AND METHOD AND PROGRAM FOR REGISTERING TERMINAL DEVICE

TECHNICAL FIELD

This invention relates to a monitoring system, a terminal device and a main control device of the monitoring system, and a method and program for registering the terminal device. For example, this invention relates to a monitoring system that allows its main control device to control its terminal device, such as a sensing unit and a camera unit in a home security system, with an ID number, the terminal device and main control device, and a method and program for registering the terminal device.

BACKGROUND ART

Home security systems have become popular recently among general homeowners for the purposes of preventing damage and losses caused by an unauthorized person and monitoring rooms to detect an abnormal condition caused by disasters, such as fire. Such home security systems include terminal devices, such as a sensing unit that detects an unauthorized person entering a house from a window or door or detects an abnormal condition in a room and a camera unit for capturing images of an intruder.

These terminal devices are controlled by a main control device, namely a main controller. The main control device specifies identifying information, such as an ID number, given to each terminal device to identify the individual terminal devices and controls the corresponding terminal devices. To this end, the identifying information of each terminal device needs to be registered with the main control device prior to the first use. In addition, identifying information of the main control device also needs to be registered with each terminal device so that the terminal devices can identify the main control device.

Such home security systems are categorized into a self-installation type involving purchase of the system by a general user and a professional-installation type. The former type requires the user, who purchased the system, to register identifying information of each terminal device with a main control device and to register identifying information of the main control device with each terminal device. The registration of the identifying information can be conducted by operating both an operation unit, like a registration switch, of the main control device and an operation unit, like a registration switch, of the each terminal device; however, the same steps have to be repeatedly conducted to register the identifying information of each terminal device with the main control device, which is burdensome for the user.

Japanese unexamined patent publication No. 2005-223791 describes a monitoring system that automatically registers identifying information of terminal devices with a main control device upon recognizing the placement of a battery in the terminal devices.

In the monitoring system of publication No. 2005-223791, the identifying information of the terminal devices can be registered with the main control device by placing the battery into the terminal devices; however, the registration of the identifying information of the terminal devices cannot be made by operating the main control device so as to make a request for the transmission of the identifying information.

DISCLOSURE OF THE INVENTION

The present invention has an object to provide a monitoring system capable of registering identifying information of a terminal device with a main control device through a simple operation conducted on the main control device side, and to provide the terminal device and the main control device, and a method and program for registering the terminal device.

The present invention provides a monitoring system comprising a terminal device having terminal identifying information for identifying itself and a main control device controlling the terminal device. The terminal device includes identifying-information output means that transmits the terminal identifying information of the terminal device as a radio signal in response to receipt of a request signal for the terminal identifying information wirelessly transmitted from the main control device. The main control device includes transmitting means that transmits the request signal for the terminal identifying information as a radio signal, receiving means that receives the terminal identifying information as a radio signal transmitted back from the terminal device, and first storage means that stores the terminal identifying information in response to receipt of the terminal identifying information by the receiving means.

Preferably, the transmitting means transmits main-control identifying information for identifying the main control device as a radio signal to the terminal device in response to receipt of the terminal identifying information by the receiving means, and the terminal device includes second storage means that stores the main-control identifying information transmitted by the transmitting means.

More specifically, the identifying-information output means is an RFID (Radio Frequency Identification) tag, while the receiving means and transmitting means are an RFID reader/writer.

Preferably, the terminal device includes power generation means that generates electric power with a radio signal received by the RFID tag and supplies the generated power to at least the second storage means. This allows the main control device to obtain the identifying information from the terminal device that is not turned on.

More specifically, the main control device includes first communication means that is separately provided from the transmitting means and allows communication between the main control device and the terminal device and main control means that permits the main control device to communicate through the first communication means with the terminal device whose identifying information has been stored in the first storage means.

More specifically, the terminal device includes second communication means that is separately provided from the identifying-information output means and allows communication between the terminal device and the main control device and terminal control means that permits the terminal device to communicate through the second communication means with the main control device whose main-control identifying information has been stored in the second storage means.

Preferably, there are provided a plurality of the terminal devices each having terminal identifying information. The first storage means of the main control device stores the terminal identifying information corresponding to each of the plurality of terminal devices. The transmitting means transmits a request signal for the terminal identifying information to each of the plurality of terminal devices. The receiving means receives the terminal identifying information transmitted from each of the terminal devices. The first storage means stores the terminal identifying information received by the receiving means. This allows the main control device to obtain the identifying information from the plurality of terminal devices at once.

In another aspect of the present invention, a terminal device of a monitoring system has identifying information for identifying itself and is controlled by a main control device. The terminal device includes receiving means that receives a request signal for requesting the transmission of the identifying information, the request signal being wirelessly transmitted from the main control device, and identifying-information output means that transmits the identifying information of the terminal device as a radio signal in response to receipt of the request signal for the identifying information by the receiving means.

In yet another aspect of the present invention, a main control device of a monitoring system controls a terminal device having terminal identifying information for identifying itself. The main control device includes transmitting means that transmits a request signal for requesting the transmission of the terminal identifying information as a radio signal, receiving means that receives the terminal identifying information as a radio signal transmitted back from the terminal device and storage means that stores the terminal identifying information in response to receipt of the terminal identifying information by the receiving means.

In yet another aspect of the present invention, a method for registering a terminal device by registering terminal identifying information for identifying the terminal device, comprises a step of transmitting a request signal for the terminal identifying information as a radio signal, a step of receiving the terminal identifying information transmitted back in response to the radio signal and a step of storing the terminal identifying information in response to receipt of the terminal identifying information.

Furthermore, in yet another aspect of the present invention, a computer program used to register terminal identifying information for identifying a terminal device, executes a function of transmitting means that transmits a request signal for requesting the terminal identifying information as a radio signal, a function of receiving means that receives the terminal identifying information as a radio signal transmitted back from the terminal device and a function of storage means that stores the terminal identifying information in response to receipt of the terminal identifying information by the receiving means.

According to the present invention, a radio signal for requesting the transmission of the terminal identifying information is transmitted to a terminal device at the request of a main control device, the terminal device transmits the requested terminal identifying information in response to the transmission request, and the identifying information is stored in the main control device. Therefore, it is possible to register the terminal identifying information of the terminal device with the main control device with a simple operation conducted on the main control device side.

BEST MODE FOR CARRYING OUT THE INVENTION

Figure 1:
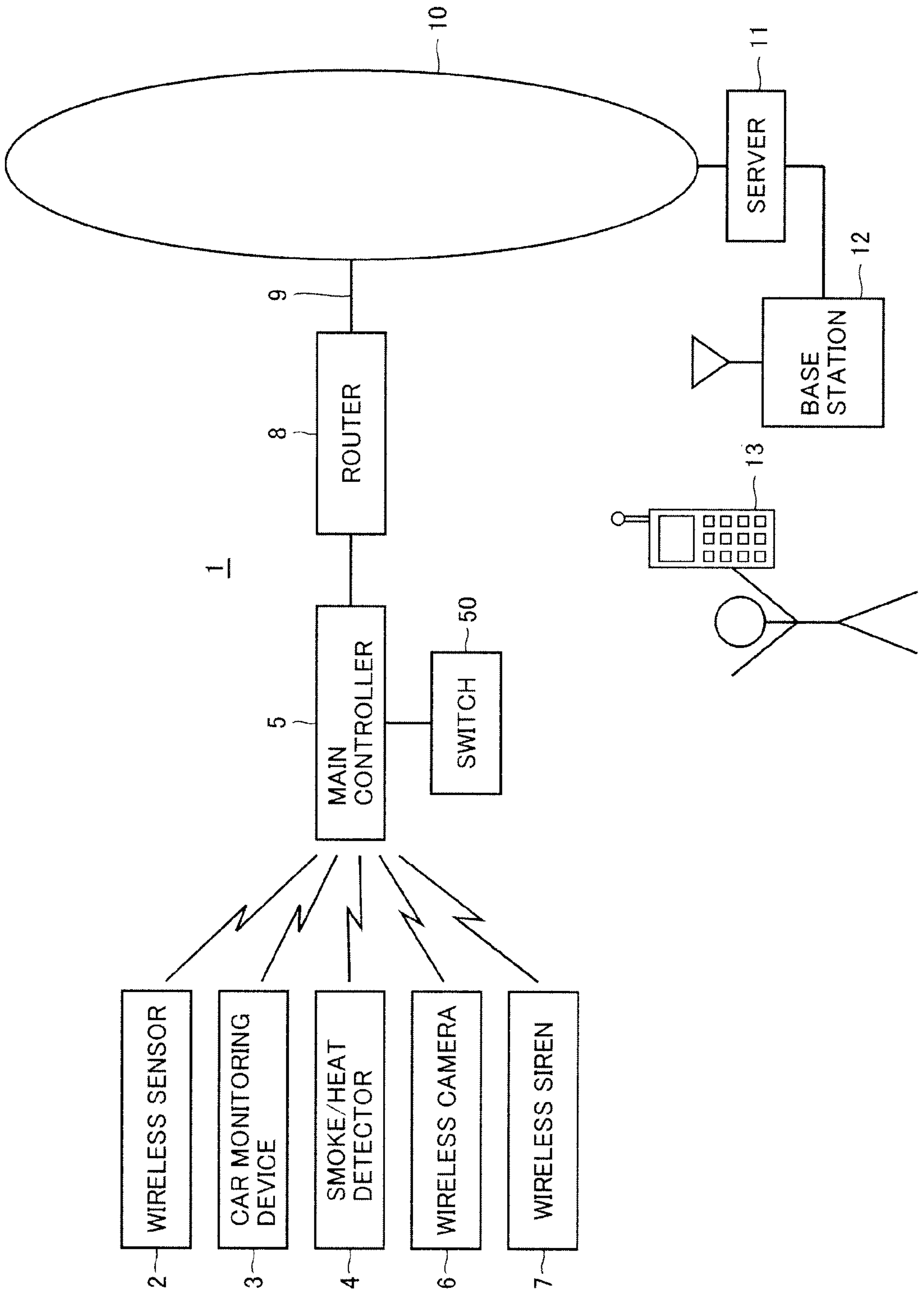
FIG. 1 is a block diagram of the entire structure of a monitoring system according to an embodiment of the invention.

FIG. 1 is a block diagram showing the entire structure of a monitoring system 1 according to an embodiment of the present invention. The monitoring system 1 of the embodiment will be described as a monitoring system applied to a home security system, but it is not limited to this. The monitoring system 1 includes a main controller 5 serving as a main control device and a wireless sensor 2, a car monitoring device 3, a smoke/heat detector 4, a wireless camera 6 and a wireless siren 7 which are terminal devices connected to and controlled by the main controller 5.

When the main controller 5 is set to an alert mode, the main controller 5 puts the wireless sensor 2, car monitoring device 3 and smoke/heat detector 4 into an operation mode, and activates the wireless siren 7 when the main controller 5 detects an abnormal condition based on the detection output from any of these terminal devices. By the way, the alert mode can be cancelled and the cancelled mode is referred to as "non-alert mode". The "abnormal condition", which will appear in the following description, is a generic term representing intrusion of an unauthorized person/unauthorized persons and disasters, for example, fire.

The wireless sensor 2 is mounted on windows and doors of a residence to monitor the condition in the security area around the wireless sensor, detects changes in the condition and determines whether the security area is in an abnormal condition such as intrusion of an unauthorized person and disasters. If there is something abnormal, the wireless sensor 2 notifies the main controller 5 of the abnormal condition.

The car monitoring device 3 detects, for example, a prowler around the homeowner's car or vibration or shock applied to the car. The smoke/heat detector 4 detects the occurrence of fire. The wireless camera 6 captures images of an intruder entering the house. When an intruder has broken in while the alert mode is on, the wireless siren 7 sounds a siren to threaten and deter the intruder. Instead of the wireless siren 7, an alarm device, like a buzzer, can be built in the main controller 5.

In addition, the main controller 5 can be connected to a switch 50 that cancels the alarm such as the siren or alarm buzzer.

The output of the main controller 5 is transmitted from a router 8 through a public telephone network 9 to the Internet 10. The Internet 10 is connected to a base station 12 via a server 11. If an abnormal event happens while the resident is out of his/her residence in which its home security system is set to the alert mode, the resident will be notified of the alerting information by an e-mail sent to the cellular phone 13 of the resident. The contact information, including e-mail addresses, of the cellular phone 13 is previously registered with the main controller 5. It is possible to send images taken by the wireless camera 6 to the cellular phone 13 and to display the images on the cellular phone 13.

Alternatively, it is also possible to notify a security company of the occurrence of the abnormal condition.

Each of the wireless sensor 2, car monitoring device 3, smoke/heat detector 4, wireless camera 6 and wireless siren 7 may be single or plural in number, or any of these can be completely omitted. In short, the system can be constructed with a minimum of any one of these terminal devices.

Each of the terminal devices, including the wireless sensor 2, car monitoring device 3, smoke/heat detector 4, wireless camera 6 and wireless siren 7, is previously assigned a terminal-device ID number which is terminal identifying information used to identify itself, while the main controller 5 is previously assigned a main-controller device ID number that is main-control identifying information. The main controller 5 identifies each terminal device based on each of their terminal-device ID numbers to control the wireless sensor 2, car monitoring device 3, smoke/heat detector 4, wireless camera 6 and wireless siren 7, thereby controlling the entire monitoring system 1. The wireless sensor 2, car monitoring device 3, smoke/heat detector 4, wireless camera 6 and wireless siren 7 recognize the main-controller device ID number to communicate with the main controller 5.

Figure 2:
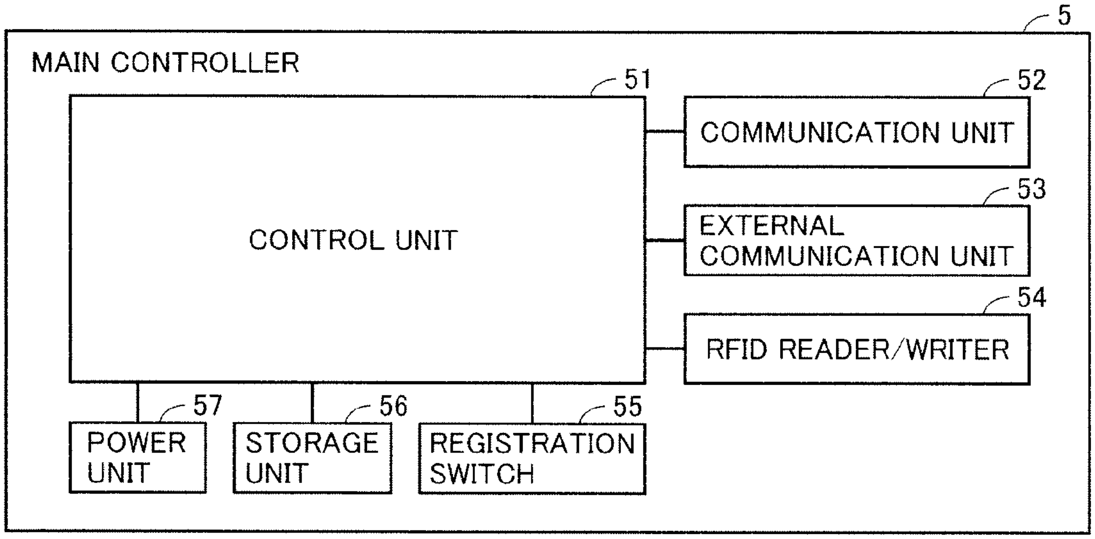
FIG. 2 is a block diagram of the main controller shown in FIG. 1.
Figure 3:
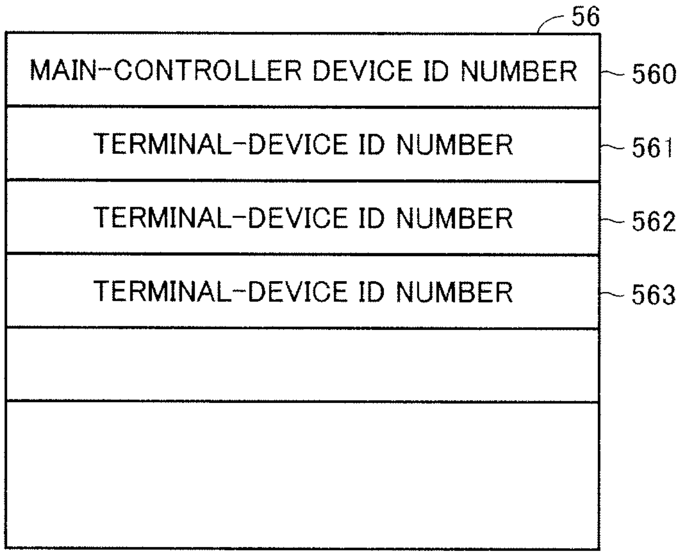
FIG. 3 is a diagrammatic view of storage areas in the storage unit shown in FIG. 2.

FIG. 2 is a block diagram of the main controller 5 shown in FIG. 1. FIG. 3 is a diagrammatic view of storage areas of the storage unit 56 shown in FIG. 2.

In FIG. 2, the main controller 5, serving as a main control device, includes a control unit 51 serving as main control means, a communication unit 52 serving as first communication means, an external communication unit 53, an RFID reader/writer 54 serving as receiving means and transmitting means, a registration switch 55, a storage unit 56 serving as storage means and first storage means, and a power unit 57. The control unit 51 controls the entire main controller 5. The communication unit 52 is an interface for the main controller 5 to communicate with the wireless sensor 2, car monitoring device 3, smoke/heat detector 4, wireless camera 6 and wireless siren 7.

The external communication unit 53 is an interface to communicate with an external network (not shown). The RFID reader/writer 54 transmits (writes) a request signal, serving as a trigger, in the form of a radio signal, that requests RFID tags 23 each provided in the wireless sensor 2, car monitoring device 3, smoke/heat detector 4, wireless camera 6 and wireless siren 7 to send their identifying information, while receiving (reading) the terminal-device ID numbers transmitted in the form of a radio signal from the wireless sensor 2, car monitoring device 3, smoke/heat detector 4, wireless camera 6 and wireless siren 7.

The registration switch 55 issues a command to register the terminal-device ID numbers of the plurality of terminal devices, including the wireless sensor 2, car monitoring device 3, smoke/heat detector 4, wireless camera 6 and wireless siren 7, with the main controller 5. The storage unit 56 has a plurality of storage areas 560, 561, 562, 563 . . . as shown in FIG. 3. In the storage area 560, the main-controller device ID number of the main controller 5 is previously stored. Each of the storage areas 561, 562, 563 . . . stores a terminal-device ID number transmitted from each of the terminal devices. The power unit 57 supplies electric power to respective units in the main controller 5.

Figure 4:
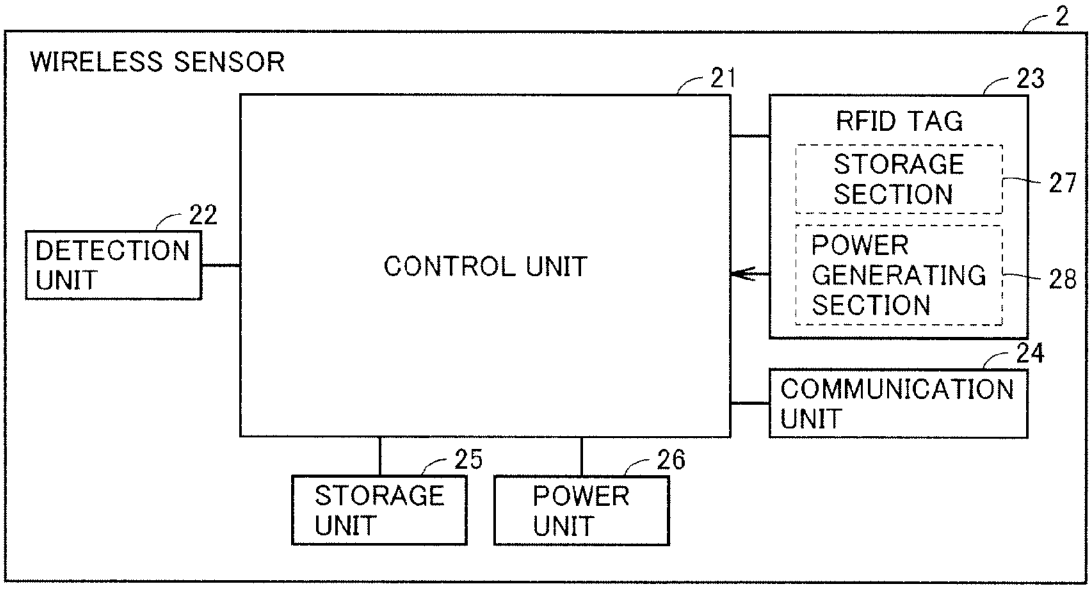
FIG. 4 is a block diagram of a wireless sensor as an example of the terminal device shown in FIG. 1.
Figure 5:
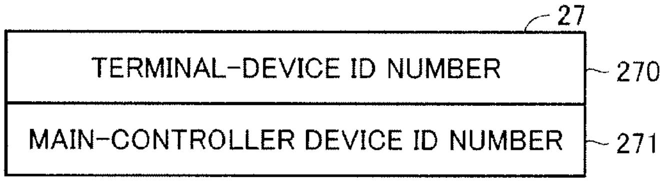
FIG. 5 is a diagrammatic view of storage areas in the storage section shown in FIG. 4.

FIG. 4 is a block diagram of a wireless sensor 2 as an example of the terminal devices shown in FIG. 1. FIG. 5 is a diagrammatic view of storage areas of the storage section 27 in the RFID tag 23 shown in FIG. 4.

In FIG. 4, the wireless sensor 2 includes a control unit 21 serving as terminal control means, a detection unit 22, an RFID tag 23 serving as identifying-information output means, a communication unit 24, a storage unit 25 serving as second storage means, and a power unit 26. The control unit 21 controls the entire wireless sensor 2. The detection unit 22 that monitors the condition of the security area and detects changes in the condition sends information about the condition change to the control unit 21.

The detection unit 22 can be anything capable of recognizing the changes in the condition, such as a vibration sensor, a pyroelectric sensor, a reed switch, a Doppler sensor and an MIR (Micropower Impulse Radar) sensor. The vibration sensor mounted on a window or door, for example, can detect vibrations caused by opening the door or noise and vibrations caused by touching a lock during picking or the like. Installation of the pyroelectric sensor and Doppler sensor enables detection of the presence of a person and the movement of an object. The reed switch and MIR sensor mounted on a door or window can detect the opening/closing of the door or window or breakage of the window glass. By the way, the MIR sensor detects an object from its reflection.

The RFID tag 23 has a storage section (memory) 27 and a power generating section 28. When the RFID reader/writer 54 in the main controller 5 transmits a radio signal, the power generating section 28 generates induced electromotive force according to the radio signal to drive the RFID tag 23 that is not supplied with electric power from the power unit 26. The storage section 27 includes storage areas 270, 271 as shown in FIG. 5. In the storage area 270, the terminal-device ID number of the wireless sensor 2 is previously stored, while the main-controller device ID number transmitted from the main controller 5 is stored in the storage area 271.

When powered on at start-up, the control unit 21 reads out the main-controller device ID number from the storage section 27 in the RFID tag 23 and writes it in the storage unit 25. This structure allows the wireless sensor 2 to register the main-controller device ID number even if the wireless sensor 2 is not supplied with electric power due to the absence of a battery, for example.

The communication unit 24 is an interface to communicate with the main controller 5. The power unit 26 includes a primary cell such as a dry cell or a rechargeable secondary cell and intermittently operates the control unit 21 in order to minimize power consumption. In other words, the power unit 26 supplies electric power to the control unit 21 only when the wireless sensor 2 communicates with the main controller 5 via the communication unit 24.

The car monitoring device 3, smoke/heat detector 4, wireless camera 6 and wireless siren 7, which are the terminal devices other than the wireless sensor 2, shown in FIG. 1 are so configured as to register the device ID numbers between them and the main controller 5 in the same manner as done by the wireless sensor 2. In other words, each of the car monitoring device 3, smoke/heat detector 4, wireless camera 6 and wireless siren 7 has components corresponding to the control unit 21, RFID tag 23, communication unit 24 and storage unit 25 in the wireless sensor 2.

Figure 6:
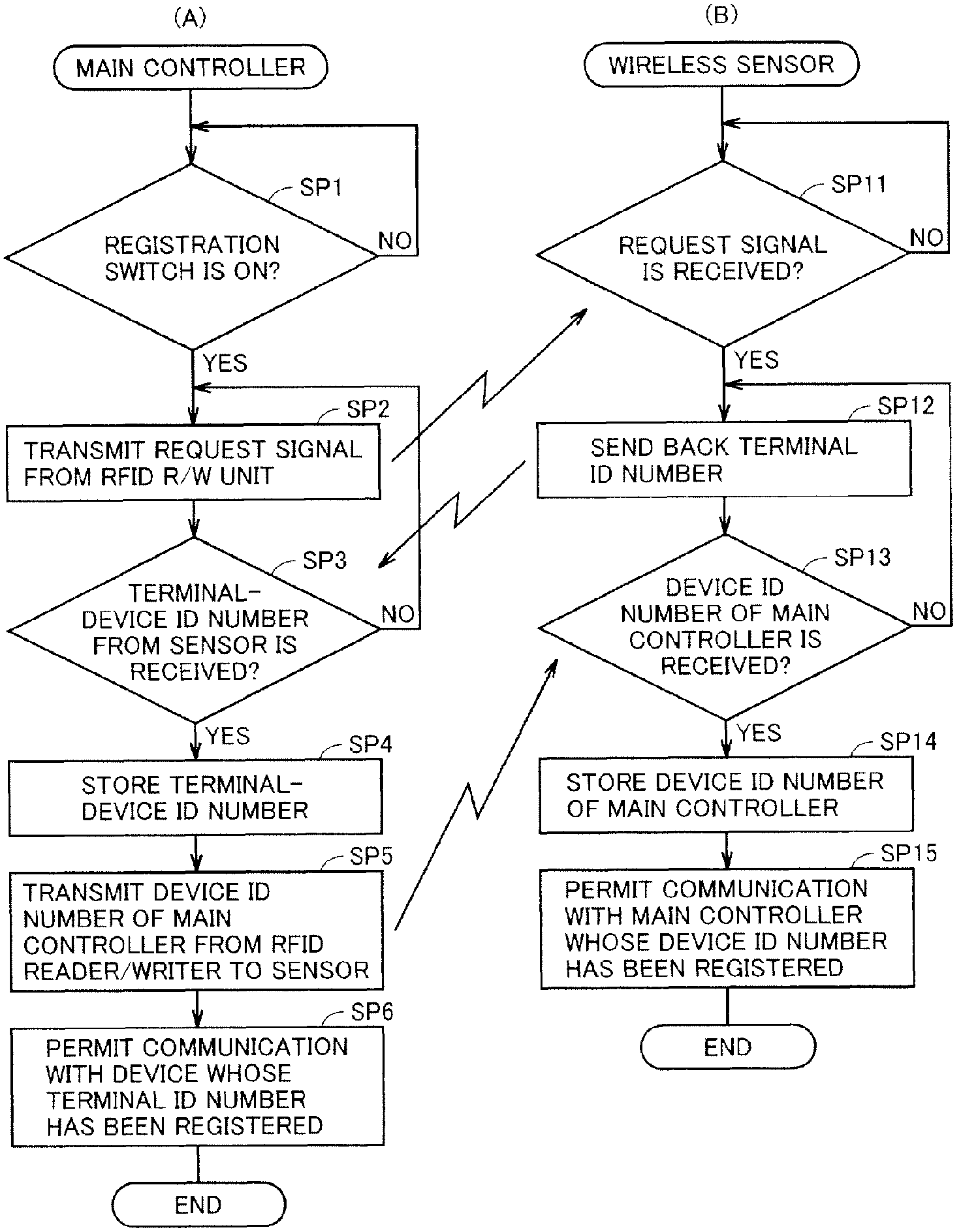
FIG. 6 is a flow chart for describing the registration operation of an ID number performed between the main controller and wireless sensor in the monitoring equipment according to an embodiment of the invention.

FIG. 6 is a flow chart for describing the registration operations of the terminal-device ID number and main-controller device ID number between the main controller 5 and wireless sensor 2 in the monitoring equipment according to the embodiment of the present invention: FIG. 6(A) indicates the operations of the main controller 5; and FIG. 6(B) indicates the operations of the wireless sensor 2.

In step (abbreviated to SP in FIG. 6) SP1 shown in FIG. 6(A), the control unit 51 of the main controller 5 determines whether the registration switch 55 of the main controller 5 is turned on. When a user turns on the registration switch 55, the control unit 51 determines that the main controller 5 has been turned on and causes the RFID reader/writer 54 to transmit a radio signal requesting the transmission of a terminal-device ID number in step SP2. Then, in step SP3, the control unit 51 determines whether the terminal-device ID number has been transmitted from the wireless sensor 2. If the terminal-device ID number has been transmitted, the operation goes to step SP4. In the case where no response is made within a fixed time period in step SP3, the operation goes back to step SP2 for retransmission of the request. If nothing responds after a certain number of retransmissions, it is desirable for the control unit 51 to determine that no terminal device exists and terminate the processing.

The power unit 26 suspends electrical supply to the control unit 21 of the wireless sensor 2 for the purpose of reducing battery drain, except when the control unit 21 communicates with the main controller 5. When the radio signal requesting the transmission of the terminal-device ID number is fed from the main controller 5 to the RFID tag 23, the power generating section 28 in the RFID tag 23 generates power by inducing electromotive force with the radio signal to drive the RFID tag 23.

In step SP11 of FIG. 6(B), the RFID tag 23 determines that it has received the request signal as a radio signal. In step SP12, the terminal-device ID number previously stored in the storage area 270 of the storage section 27 is read out to be sent as a radio signal. Then, in step SP13, the RFID tag 23 waits for the main-controller device ID number to be transmitted from the main controller 5.

When the control unit 51 of the main controller 5 determines that it has received the terminal-device ID number from wireless sensor 2 via the RFID reader/writer 54 in step SP3, the control unit 51 stores the received terminal-device ID number in the storage area 561 of the storage unit 56 in step SP4. In step SP5, the control unit 51 reads out the main-controller device ID number of the main controller 5, which is stored in the storage area 560 of the storage unit 56, and transmits it through the RFID reader/writer 54 to the wireless sensor 2. The control unit 51, in step SP6, hereinafter permits communication with wireless sensor 2 whose terminal ID number has been registered.

When the main-controller device ID number of the main controller 5 is determined to be received in step SP13, the RFID tag 23 of the wireless sensor 2 stores the received main-controller device ID number in the storage area 271 of the storage section 27 in step SP14.

At power on, the wireless sensor 2 stores the main-controller device ID number stored in the storage section 27 of the RFID tag 23 into the storage unit 26. In step SP15, the control unit 21 hereinafter permits communication with main controller 5 whose main-controller device ID number has been registered.

As described above, according to the embodiment, a push of the registration switch 55 of the main controller 5 can store the terminal-device ID number of the wireless sensor 2 in the storage unit 56 of the main controller 5, while storing the main controller device ID number of the main controller 5 in the storage section 27 of the RFID tag 23 of the wireless sensor 2. This eliminates the separate operations for registering the terminal-device ID number of the wireless sensor 2 with the main controller 5 and registering the main-controller device ID number of the main controller 5 with the wireless sensor 2, thereby eliminating cumbersome works for users.

Since the RFID tag 23 of the wireless sensor 2 is provided with the power generating section 28 therein that drives the RFID tag 23 with the electromotive force induced by radio signals transmitted from the main controller 5, even when the RFID tag 23 is not supplied with electric power from the power unit 26 or when a battery cell is not placed in the power unit 26, it is possible to read out the terminal-device ID number in the storage section 27 of the RFID tag 23 and to store the main-controller device ID number in the storage section 27.

Although the above-described operations for registering the identifying information are performed between the wireless sensor 2, as an example of the terminal devices, and the main controller 5, the same operations will be performed for the car monitoring device 3, smoke/heat detector 4, wireless camera 6 and wireless siren 7.

In the case where a plurality of terminal devices, such as wireless sensors 2, are provided, the registration operations are repeatedly performed for every terminal devices with their terminal-device ID numbers each transmitted from the terminal devices until no terminal-device ID number is transmitted back from the terminal devices. The terminal device whose terminal ID number has been registered does not transmit back its terminal ID number.

There are some methods for distinguishing the terminal devices from each other. In a method disclosed in Japanese patent No. 3584335, a period of time for requiring a terminal device to respond is determined with a random number. In another method, each terminal device is assigned with unique data for collation. If some terminal devices respond at the same time and interfere with each other, the terminal devices are collated with the collation data advanced by 1 bit at a time.

In addition, it is possible by a push of the registration switch 55 of the main controller 5 to request each of the terminal devices, including the wireless sensor 2, car monitoring device 3, smoke/heat detector 4, wireless camera 6 and wireless siren 7, to transmit their own terminal-device ID numbers at once and store them in the storage areas 561 to 563 of the storage unit 56, respectively. In this case, the terminal-device ID numbers, each corresponding to the wireless sensor 2, car monitoring device 3, smoke/heat detector 4, wireless camera 6 and wireless siren 7, are concurrently transmitted to the RFID reader/writer 54 of the main controller 5. The control unit 51 identifies each terminal-device ID number and stores the terminal-device ID numbers in the storage areas 561 to 563 of the storage unit 56, respectively.

Accordingly, by only operating the registration switch 55 of the main controller 5, the terminal-device ID numbers of the wireless sensor 2, car monitoring device 3, smoke/heat detector 4, wireless camera 6 and wireless siren 7 can be registered with the main controller 5 at the same time, which eliminates the drudgery of repeating the registration operation for every terminal device.

Terminal devices with the terminal-device ID numbers having already been registered with the main controller 5 do not respond even if the main controller 5 requests them to transmit their terminal-device ID numbers. Because of this, in the case where a terminal device is added to the system, a push of the registration switch 55 can register only the terminal-device ID number of the added terminal device with the main controller 5 in the same manner.

If a terminal-device ID number needs to be deleted, the only operation to be done is to delete the terminal-device ID number in the storage unit 56 shown in FIG. 3, and nothing needs to be done on the terminal device side.

The terminal device can be a lighting control device or a home-appliance control device.

Furthermore, the present invention is not limited to home security systems and is available for general systems including a main control device and a terminal device. For example, if the invention is adopted in a power consumption monitoring system, the terminal device is a watt-hour meter.

The foregoing has described the embodiment of the present invention by referring to the drawings; however, the invention should not be limited to the illustrated embodiment. It should be appreciated that various modifications and changes can be made to the illustrated embodiment within the scope of the appended claims and their equivalents.

INDUSTRIAL APPLICABILITY

The monitoring system and its terminal device and main control device of the present invention can be used in various applications including a home security system for detecting abnormal conditions in ordinary households.

What is claimed is:

1. A monitoring system comprising:

a terminal device having terminal identifying information for identifying itself; and a main control device having main control device identifying information and configured to control said terminal device, wherein:

said terminal device comprises an RFID tag configured to transmit the terminal identifying information of the terminal device as a radio signal in response to receipt of a request signal for the terminal identifying information wirelessly transmitted from said main control device, and said RFID tag is configured to send back said terminal identification information if said main control device identifying information is not stored in said terminal device, said main control device comprises:

an RFID reader/writer configured to transmit said request signal for the terminal identifying information as a radio signal before registration of said terminal identifying information and receive the terminal identifying information as a radio signal transmitted back from said terminal device;

a first storage unit configured to store the terminal identifying information in response to receipt of the terminal identifying information by said RFID reader/writer;

a first communication unit configured to communicate with said terminal device; and a main control unit configured to permit the main control device to communicate through said first communication unit with the terminal device whose said main control device identifying information has been stored in said first storage unit, wherein said RFID reader/writer is configured to transmit the main control device identifying information as a radio signal to said terminal device in response to receipt of said terminal identifying information before registration of said main control device identifying information;

wherein said RFID reader/writer is provided separately from said first communication unit;

wherein said RFID tag comprises:

a second storage unit configured to store the main control device identifying information transmitted by said RFID reader/writer; and a power generation unit configured to generate electric power from a radio signal received by said RFID tag and supply the generated power to at least said second storage power, wherein said terminal device further comprises:

a second communication unit configured to communicate with said main control device;

a power unit;

a third storage unit provided separately from said RFID tag; and a terminal control unit configured to permit the terminal device to communicate through said second communication unit with the main control device whose said main control device identifying information has been stored in said third storage unit;

wherein said RFID tag is provided separately from said second communication unit, and wherein said terminal control unit reads out said main control device identifying information from said second storage unit and writes said main control device identifying information in said third storage unit, when said terminal device is powered on at start-up by said power unit.

2. The monitoring system according to claim 1, wherein:

a plurality of said terminal devices are provided each having terminal identifying information, said first storage unit of said main control device stores the terminal identifying information corresponding to each of said plurality of terminal devices, said RFID reader/writer is configured to transmit a request signal for the terminal identifying information to each of said plurality of terminal devices, said RFID reader/writer is configured to receive the terminal identifying information transmitted from each of said terminal devices, and said first storage unit stores the terminal identifying information received by said RFID reader/writer.

3. A terminal device of a monitoring system, said terminal device having identifying information for identifying itself and being controlled by a main control device having main control device identifying information, comprising:

an RFID reader/writer configured to receive a request signal for requesting the transmission of the identifying information, said request signal being wirelessly transmitted from said main control device;

a first storage unit configured to store the main control device identifying information transmitted by said RFID reader/writer;

an RFID tag configured to transmit the identifying information of the terminal device as a radio signal in response to receipt of the request signal for the identifying information by said RFID reader/writer;

wherein said RFID tag comprises:

a second storage unit configured to store the main control device identifying information transmitted by said RFID reader/writer; and a power generation unit configured to generate electric power from a radio signal received by said RFID tag and supply the generated power to at least said second storage power, a communication unit configured to communicate with said main control device, and a main control unit configured to permit the main control device to communicate through said communication unit with the terminal device whose said main control device identifying information has been stored in said first storage unit, a power unit;

a third storage unit provided separately from said RFID tag;

a terminal control unit configured to permit the terminal device to communicate through said communication unit with the main control device whose said main control device identifying information has been stored in said third storage unit;

wherein said terminal control unit reads out said main control device identifying information from said second storage unit and writes said main control device identifying information in said third storage unit, when said terminal device is powered on at start-up by said power unit;

wherein said RFID tag is configured to send back said terminal identification information if said main control device identifying information is not stored in said terminal device.

4. A method for registering a terminal device by registering terminal identifying information for identifying the terminal device, the method comprising:

transmitting, from an RFID reader/writer of a main control device having main control device identifying information, a request signal for said terminal identifying information as a radio signal, wherein the request signal is transmitted before registration of the terminal identifying information;

transmitting, by said RFID reader/writer, said main control device identifying information as a radio signal to said terminal device in response to receipt of said terminal identifying information before registration of said main control device identifying information;

receiving the terminal identifying information transmitted back from an RFID tag of the terminal device in response to said radio signal if the main control device identifying information is not stored in the terminal device;

storing, in a first storage unit, the terminal identifying information in response to receipt of said terminal identifying information;

reading out, by a terminal control unit, said main control device identifying information from a second storage unit;

writing, by said terminal control unit, said main control device identifying information in a third storage unit of said terminal device, said third storage unit provided separately from said RFID tag, when said terminal device is powered on at start-up by a power unit;

wherein the RFID tag comprises said second storage unit, said second storage unit configured to store said main control device identifying information transmitted by said RFID reader/writer;

wherein said terminal control unit is further configured to permit said terminal device to communicate through a communication unit with said main control device whose said main control device identifying information has been stored in said third storage unit.

5. The method according to claim 4, further comprising:

storing, by said first storage unit of said main control device, terminal identifying information corresponding to each of a plurality of said terminal devices, transmitting, by said RFID reader/writer, a request signal for the terminal identifying information to each of said plurality of terminal devices, receiving, by said RFID reader/writer, the terminal identifying information transmitted from each of said terminal devices, and storing, by said first storage unit, the terminal identifying information received by said RFID reader/writer.

6. At least one non-transitory computer-readable medium having instructions stored thereon for execution by at least one processing circuit, the instructions comprising:

registering terminal identifying information for identifying a terminal device;

transmitting, using an RFID reader/writer of a main control device having main control device identifying information, a request signal for requesting said terminal identifying information as a radio signal, wherein the request signal is transmitted before registration of the terminal identifying information;

transmitting, by said RFID reader/writer, said main control device identifying information as a radio signal to said terminal device in response to receipt of said terminal identifying information before registration of said main control device identifying information;

receiving, using said RFID reader/writer, the terminal identifying information as a radio signal transmitted back from said terminal device when the main control device identifying information is not stored in the terminal device; and storing, using a first storage unit, the terminal identifying information in response to receipt of said terminal identifying information by said RFID reader/writer;

reading out, by a terminal control unit, said main control device identifying information from a second storage unit;

writing, by said terminal control unit, said main control device identifying information in a third storage unit of said terminal device, said third storage unit provided separately from said RFID tag, when said terminal device is powered on at start-up by a power unit;

wherein the RFID tag comprises said second storage unit, said second storage unit configured to store said main control device identifying information transmitted by said RFID reader/writer;

wherein said terminal control unit is further configured to permit said terminal device to communicate through a communication unit with said main control device whose said main control device identifying information has been stored in said third storage unit.

7. The at least one computer-readable medium according to claim 6, the instructions further comprising:

storing, by said first storage unit of said main control device, terminal identifying information corresponding to each of a plurality of said terminal devices, transmitting, by said RFID reader/writer, a request signal for the terminal identifying information to each of said plurality of terminal devices, receiving, by said RFID reader/writer, the terminal identifying information transmitted from each of said terminal devices, and storing, by said first storage unit, the terminal identifying information received by said RFID reader/writer.

* * * * *